(No Model.)

C. S. WESTCOTT.
HERMETICALLY SEALED POT.

No. 264,385. Patented Sept. 12, 1882.

WITNESSES:
Wm H. Powell.

INVENTOR
Charles S. Westcott,
By Connolly Bros.,
ATTORNEYS.

UNITED STATES PATENT OFFICE.

CHARLES S. WESTCOTT, OF PHILADELPHIA, PENNSYLVANIA.

HERMETICALLY-SEALED POT.

SPECIFICATION forming part of Letters Patent No. 264,385, dated September 12, 1882.

Application filed March 22, 1882. (No model.)

*To all whom it may concern:*

Be it known that I, CHARLES S. WESTCOTT, a citizen of the United States, residing at Philadelphia, in the county of Philadelphia and State of Pennsylvania, have invented certain new and useful Improvements in Hermetically-Sealed Pots for Meats, Meat-Extracts, &c.; and I do hereby declare the following to be a full, clear, and exact description of the invention, reference being had to the accompanying drawings, which form part of this specification, in which—

Figure 1:
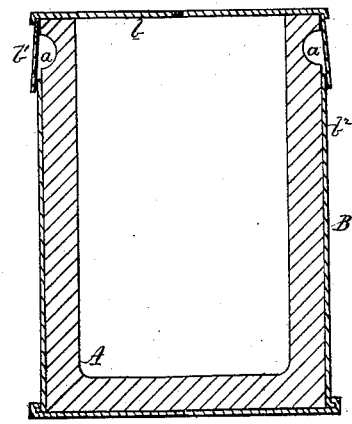
Figure 2:
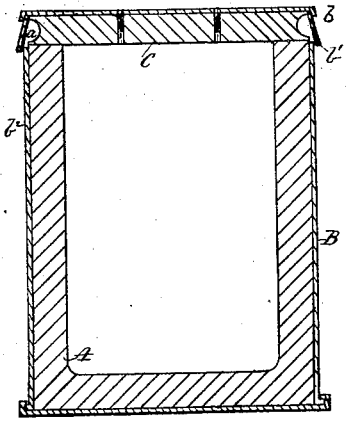
Figure 3:
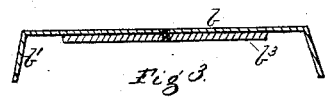
Figure 4:
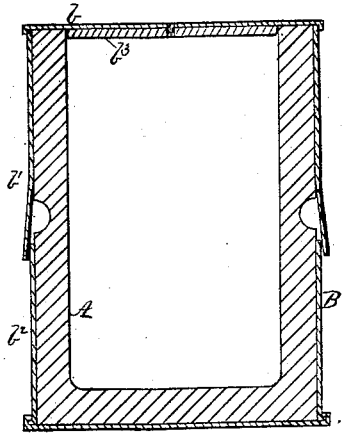
Figure 5:
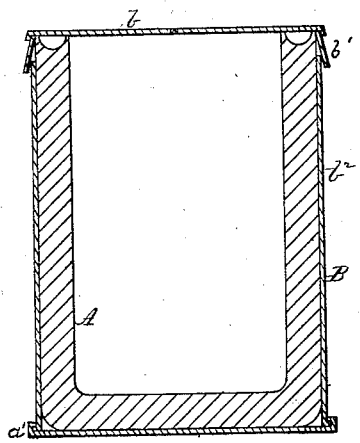

Figure 1 is a vertical section showing groove in the body of internal vessel. Fig. 2 is a vertical section showing internal lid with groove. Fig. 3 is a section of tin lid with internal cork or wood pad. Fig. 4 is a vertical section showing groove about the middle of internal vessel and cork or wood pad on slip-top. Fig. 5 is a vertical section showing groove in upper edge of internal vessel.

My invention has for its object to provide means for hermetically sealing meats, meat-extracts, and other food preparations containing salt or acids in such manner as to prevent their contact with tin and to preserve from mold, decomposition, or other injury the albuminous properties of the flesh of animal food or fish.

My invention has for its further object to provide means whereby pots, jars, &c., containing hermetically-sealed meats, extracts, &c., may be readily and expeditiously opened.

My invention consists in the peculiar construction and combination of parts hereinafter set forth, and essentially in the combination of an internal vessel or pot of china, crockery, porcelain, glass, or vitrified or unvitrified material with an external vessel of tin or other metal, said parts being so constructed that they may be readily opened to obtain access to their contents.

Referring to the accompanying drawings, A designates a pot or vessel, of any suitable or convenient shape, composed of china, crockery, porcelain, glass, or vitrified or unvitrified material, having an external annular groove, $a$. B represents a tin can or case of corresponding shape, into which the pot or vessel A is fitted and rests. Said can B has a slip-top, $b$, with a flange, $b'$, which latter is adapted and designed to be soldered to the body $b^2$. Said flange, or a portion of it, is made of taggers tin or other soft metal, which may be readily penetrated with a knife or other similar tool, such flange, when the top is on the body, occupying a position just outside of the groove $a$ in the vessel or pot A.

The vessel or pot A is designed to hold meat or food preparations—such as extract of beef— which contain salt, which if brought into contact with tin—or beef preparations containing albumen, which if exposed to the air—result injuriously. Such extracts or preparations of beef, for their efficient preservation, require to be hermetically sealed. The extract or other preparation being placed in the pot A, the latter, either then or previously, is fitted in the can B. The lid $b$ is then slipped on over the latter and soldered in position around its edge, so as to make a perfectly-tight joint. The vessel, which now consists of the pot A and its metallic integument, is then "processed"— that is, placed in a hot bath—a pin-hole being made in the lid to permit the expulsion of the air, after which such pin-hole is soldered. The contents of the vessel are thus hermetically sealed, and at the same time out of contact with metal. If such contents be meat or extract of beef, they will harden so as not to move about in the internal vessel or come in contact with the metal lid $b$. In practice the internal vessel is never wholly filled, so that the contents do not touch the top $b$. Where, however, such contents are of a fluid or semi-fluid character, contact thereof with the lid $b$ may be prevented by placing inside of the latter a pad or disk, of cork, wood, or other similar material, as shown at $b^3$ in Fig. 3; or the pot A may be provided with a lid of the same material as itself, as shown at C in Fig. 2.

When it is desired to obtain access to the contents of the vessel this may be readily done by inserting a knife or other tool in the flange $b'$ of the lid B, so that its point will enter the groove $a$ in the pot A. The metal may then be readily severed by running the knife or other tool around in the groove, the latter serving as a guide and aiding the cutting operation. The upper part of the lid is thus loosened and may be readily removed and, when required, used over again as a cover.

Where the pot A is provided with a cover, C, of same material, as shown in Fig. 2, the groove $a$ may be made in such cover, as shown, and if such groove be made in the body of the pot it need not necessarily be near the top, but may be made midway between the top and bottom, or farther down; or the groove may be wholly dispensed with, the pot A and integument B being made of such shape that there will be left a space around the bottom, as shown at $a'$, into which the point of the knife or opener will penetrate.

By means of the construction described it will be observed that the contents of the vessel are hermetically sealed, which, for practical purposes, it is only possible to do efficiently with metal, while at the same time the contents of the vessel are protected from contact with metal.

When access to the contents of the vessel is desired the same may be readily had by removing a portion of the lid in the manner specified.

What I claim as my invention is as follows:

1. A vessel for holding meats, extracts, and food preparations, consisting of an internal vessel composed of china, crockery, porcelain, glass, or vitrified material, and an external metallic can hermetically sealed, substantially as shown and specified.

2. The combination, with an internal vessel, A, composed of china, crockery, porcelain, glass, or vitrified material, of an external metallic can, B, having a lid, $b$, soldered to said can, substantially as shown and described.

3. The combination, with ceramic vessel A, having a groove, $a$, of an external metallic can, B, a portion of the lid of which is composed of soft metal, covering said groove, substantially as shown, and for the purpose set forth.

In testimony that I claim the foregoing I have hereunto set my hand this 15th day of March, 1882.

CHARLES S. WESTCOTT.

Witnesses:
HENRY HARTMAN,
W. S. MERSEREAU.